United States Patent [19]

Kaga

[11] Patent Number: 5,188,000
[45] Date of Patent: Feb. 23, 1993

[54] STEERING WHEEL HAVING AN AIR BAG UNIT

[75] Inventor: Kouichi Kaga, Inazawa, Japan

[73] Assignee: Toyoda Gosei Co., Ltd., Nishikasugai, Japan

[21] Appl. No.: 783,255

[22] Filed: Oct. 28, 1991

[30] Foreign Application Priority Data

Oct. 30, 1990 [JP] Japan ................... 2-294205

[51] Int. Cl.$^5$ ............................................. B62D 1/04
[52] U.S. Cl. ........................................ 74/552; 74/558; 280/731; 29/894; 29/894.1
[58] Field of Search ............... 74/552, 558; 200/61.54, 200/61.57; 280/731, 750; 29/159 B, 894, 894.1

[56] References Cited

U.S. PATENT DOCUMENTS

| | | | |
|---|---|---|---|
| 1,967,060 | 7/1934 | Mungen | 74/552 |
| 2,623,405 | 12/1952 | Sampson | 74/552 |
| 3,726,152 | 4/1973 | Tsuneizumi | 74/552 |
| 4,161,892 | 7/1979 | Conterno | 74/552 |
| 4,631,976 | 12/1986 | Noda et al. | 74/552 |
| 4,876,915 | 10/1980 | Iuchi | 74/552 |

FOREIGN PATENT DOCUMENTS

| | | | |
|---|---|---|---|
| 1010393 | 6/1957 | Fed. Rep. of Germany | 74/552 |
| 3612688 | 10/1986 | Fed. Rep. of Germany | 74/552 |
| 62-234762 | 10/1987 | Japan . | |

Primary Examiner—David A. Scherbel
Assistant Examiner—Winnie Yip
Attorney, Agent, or Firm—Cushman, Darby & Cushman

[57] ABSTRACT

A steering wheel with an air bag unit includes spoke cores each of which is formed by die casting and is mounted at a distal end portion of the spoke portion around a ring core so as to separate the ring core into ring core segments. A front part of the distal end portion of each of two spoke cores, which support the front ring core segment having the largest span, has a vertical thickness larger than a thickness of the distal end portion in a radial direction of the steering wheel.

5 Claims, 2 Drawing Sheets

STEERING WHEEL HAVING AN AIR BAG UNIT

BACKGROUND OF THE INVENTION

1. Field of the Invention

The present invention relates to a steering wheel with an air bag unit.

2. Description of the Related Art

In the steering wheel with an air bag unit, it is generally desired to lighten the steering wheel itself since the air bag unit is relatively heavy (4 kg, for instance). Furthermore, when visibility is considered, it is required that spoke portions of the steering wheel be disposed as close to the driver as possible to secure a sufficient field of vision for the driver.

To lighten the steering wheel, the ring core of the wheel may be constructed hollow or be of a reduced diameter. To secure a sufficient field of vision, it is possible to arrange the spoke portions of the steering wheel so that among the spans of the ring portion which are supported by adjacent spoke portions, the part of the ring portion disposed nearest the vehicles windshield (front) has the largest span equal to or larger than about ⅓ of the circumference of the ring portion.

Such a steering wheel with an air bag unit is, however, liable to fail to sustain a load when the air bag is expanded. This is because in this event the air bag unit is usually subjected to an upwardly forward component of force, and hence a relatively large load is applied to the front portion of the ring portion of the steering wheel (Japanese Patent Unexamined Publication 62-234762).

SUMMARY OF THE INVENTION

Accordingly, it is an object of the present invention to provide a steering wheel with an air bag unit, the steering wheel being capable of sufficiently meeting requirements of weight reduction visibility and high rigidity.

In view of this and other objects the present invention provides a steering wheel adapted for use with an air bag unit, wherein among ring core segments, supported on spoke cores, of a ring core, the front ring core segment has the largest span. The invention includes each of the spoke cores being a die cast molding and including a distal end portion mounted around the ring core to form the ring core segments. The distal end portion of each of two spoke core which support the front ring core segment comprises a front part and rear part, the front part having a vertical thickness larger than a thickness thereof in a radial direction of the steering wheel.

In the present invention, the spoke cores are disposed so that the front ring core segment has the largest span and hence sufficient visibility is secured. Furthermore, a front part of the distal end portion of each of two spoke cores which support the front ring core segment having the largest span has a vertical thickness larger than its thickness in a radial direction of the steering wheel. This enables the front part of the ring portion of the steering wheel to be relatively enhanced in rigidity without conflicting with the requirement of lightening the steering wheel.

BRIEF DESCRIPTION OF THE DRAWINGS

Other objects, features and characteristics of the present invention, as well as functions of the related elements of the structure, will become apparent upon consideration of the following description and the appended claims with reference to the accompanying drawings, all of which form a part of this specification, wherein like reference numerals designate corresponding parts in the various figures. In the drawings:

FIG. 5 is a plan view of the steering wheel, with an air bag unit, according to the present invention.

DETAILED DESCRIPTION OF THE PRESENTLY PREFERRED EXEMPLARY EMBODIMENTS OF THE INVENTION

Figure 4:
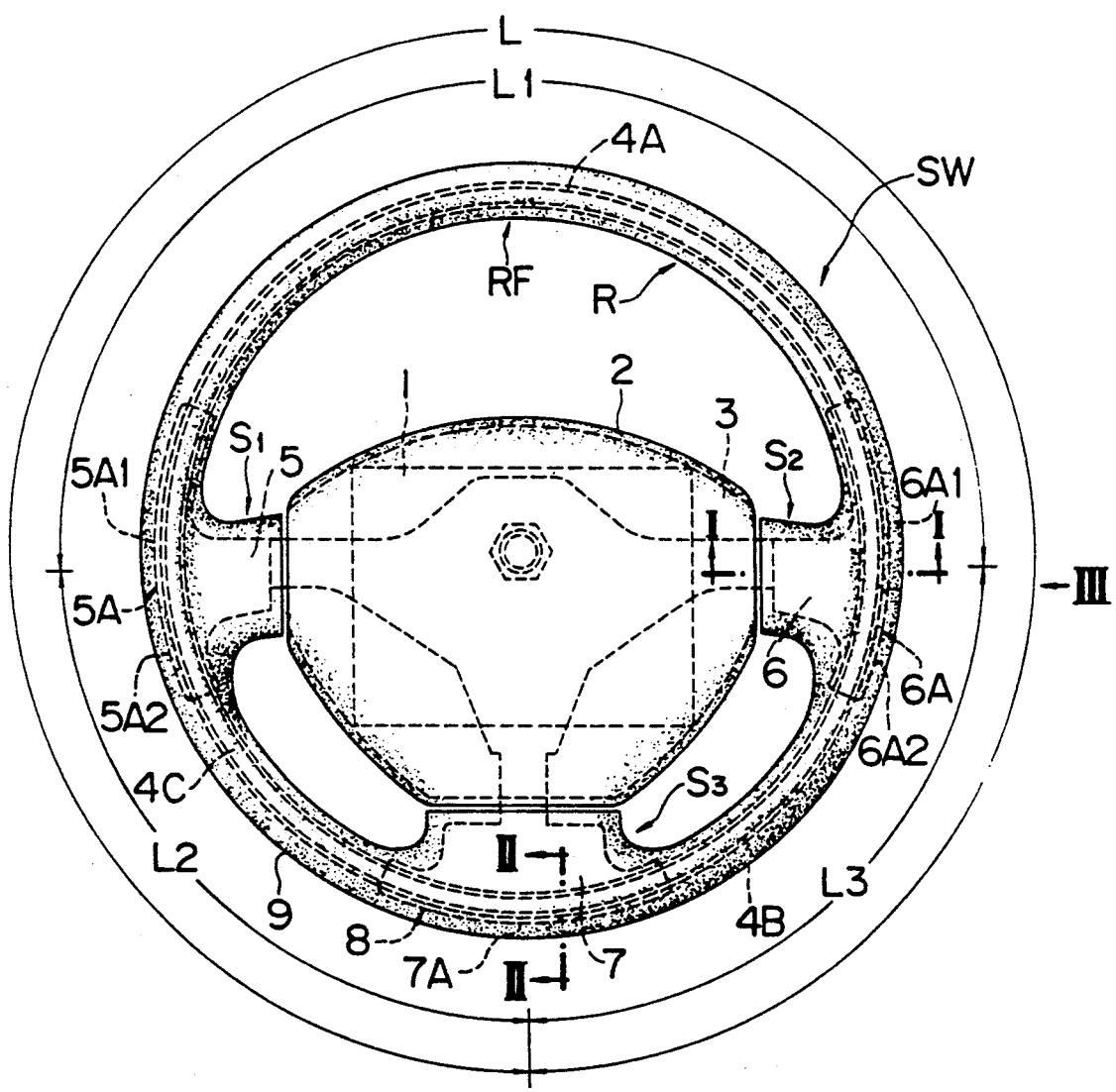

FIG. 4 illustrates a steering wheel SW produced according to the present invention, and the steering wheel SW is provided with an air bag unit 1. The air bag unit 1 is accommodated in a space defined by a lower cover 2 and pad 3 in a conventional fashion.

The steering wheel SW has a ring portion R joined to three spoke portions S1, S2 and S3. The ring portion R includes a steering wheel core 8 which includes a hollow ring core 4 and distal end portions 5A, 6A and 7A of spoke cores 5 to 7 which are aluminum die cast moldings molded over the ring core 4 at positions corresponding to the spoke portions S1, S2 and S3. The entire surface of the steering wheel core 8 is coated with a coating 9 formed of a polyurethane resin or a similar synthetic resin. In the portions except the portions joined to the spoke cores 5 to 7 the steering wheel core 8 consists of only the ring core 4. That is, the distal end portions 5A, 6A and 7A do not extend past spoke portions S1, S2 and S3.

In the ring portion R, there are provided three ring core segments 4A, 4B and 4C, separated by means of the three spoke cores 5 to 7. Among these ring core segments, a front ring core segment 4A has a span of length L1 equal to about half of the overall circumference L of the wheel. This provides enhanced visibility.

Figure 1:
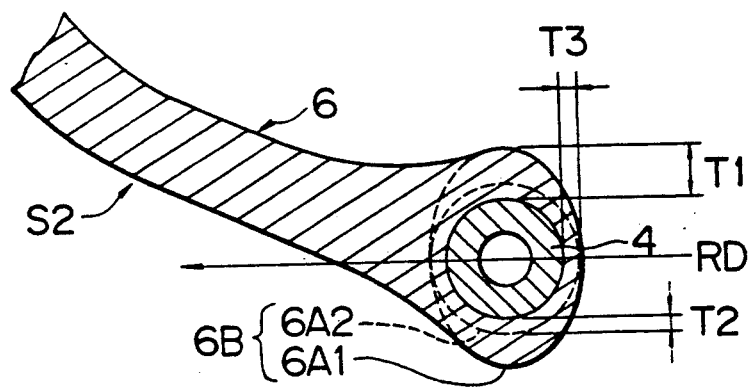
FIG. 1 is an enlarged fragmentary crosssectional view of a spoke core of a steering wheel with an air bag unit, according to the present invention, and shown in FIG. 4, and is taken along line I—I of FIG. 4.
Figure 2:
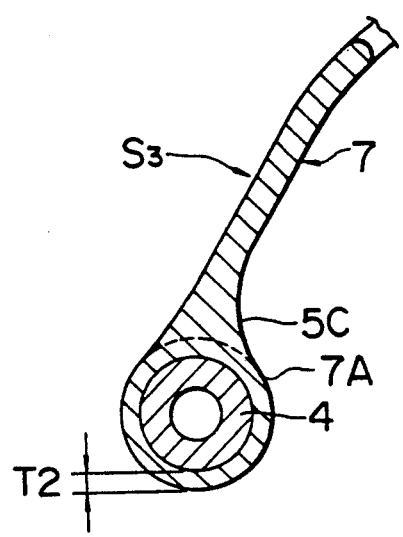
FIG. 2 is an enlarged fragmentary crossectional view of the spoke core of FIG. 4, and is taken along line II—II of FIG. 4.
Figure 3:
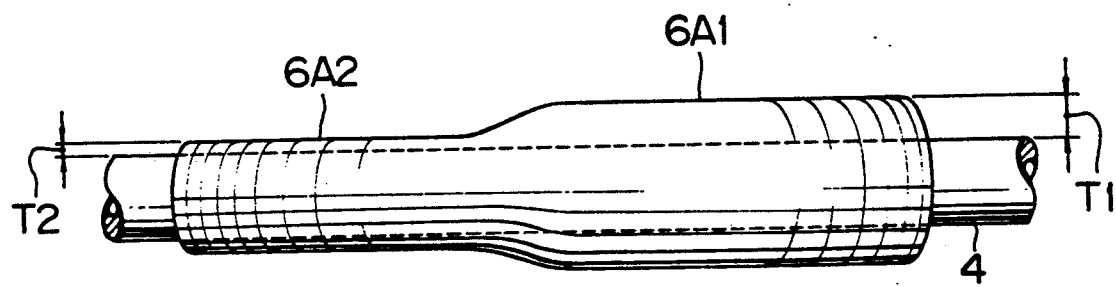
FIG. 3 is an enlarged view of the spoke core as viewed in the direction of arrow III in FIG. 4.

The distal portions 5A and 6A of the spoke cores 5 and 6, which correspond to spoke portions S1 and S2 supporting the span L1 are symmetrically formed and include front parts 5A1, 6A1 and rear portions 5A2, 6A2, respectively. As shown in FIG. 1, the vertical thickness T1 of each of the front parts 5A1 and 6A1 is larger than the thickness T3 thereof in the radial direction RD of the steering wheel. The vertical thickness T1 of the front parts 5A1 and 6A1 is considerably larger than the vertical thickness T2 of the rear parts 5A2 and 6A2 as can be seen in FIG. 3 as well as FIG. 1.

In this embodiment, the spoke cores 5-7 are arranged so that the front ring core segment 4A of the ring core 4 has a span L1 of about half of the circumference L of the ring core 4, and hence sufficient visibility is secured. Furthermore, in this embodiment, the front portion RF of the ring portion R has a relatively increased rigidity that does not conflict with the requirement of lightening of the steering wheel in weight on the basis of the following features: the ring core 4 is hollow; the vertical thickness T1 of each of the front parts 5A1 and 6A1 of the distal end portions 5A and 6A corresponding to the spoke core 5 and 6 is larger than the radial thickness T3 thereof; and the vertical thickness T1 of the front parts 5A1 and 6A1 is considerably larger than the vertical thickness T2 of the rear parts 5A2 and 6A2. However, the thickness T1 may be equal to the thickness T2.

Although the steering wheel SW with the air bag unit of this embodiment is a three spoke type steering wheel, the present invention is not limited to this. The present invention may applied to steering wheels with four or more spokes.

To further reduce the weight of the ring core 4, a solid and considerably reduced diameter core may be used instead of the hollow core. The spoke cores 5-7 are not limited to aluminum die cast moldings but may be zinc die cast moldings.

In the embodiment previously described, the ratio of the span L1 over the circumference L of the ring core 4 is about ½ but may be larger than about ½.

The present invention has been described in relation to what is presently considered to be the most practical and preferred embodiment. However, various modifications and equivalent arrangements are included within the spirit and scope of the appended claims.

What is claimed is:

1. A steering wheel adapted for use with an air bag unit, wherein ring core segments of a ring core are supported on spoke cores, and wherein a front ring core segment has the largest span, the steering wheel comprising:

a plurality of spoke cores, wherein each of the spoke cores is a die cast molding and includes a distal end portion mounted around the ring core, thus forming the ring core segments; and said distal end portion of two of said spoke cores which support the front ring core segment having a first part and a second part, extending along a circumference of the ring core, the first part having a vertical thickness larger than a radial thickness of the first part in a radial direction of the steering wheel, wherein said first part is disposed toward the front ring core segment and said second part is disposed away from the front ring core segment.

2. A steering wheel as recited in claim 1, wherein the first part of each of the distal end portions is larger in vertical thickness than the second part of the distal end portions.

3. A steering wheel as recited in claim 2, wherein the ring core is hollow.

4. A steering wheel as recited in claim 3, wherein a span of the front ring core segment is at least about one half of the circumference of the ring core.

5. A steering wheel having an air bag unit disposed within a center portion thereof, said steering wheel comprising:

a ring core member; and a plurality of spoke portions extending from said center portion to said ring core member, each of the spoke portions including a distal portion connected to the ring core member, said spoke portions separating said ring core member into a plurality of sections along a circumference of the ring core member that including at least a first second and third section.

said distal portions of the spoke portions which separate said first section of said ring core member from the other portions spoke portions having a first extension, which extends onto said first section, having a vertical thickness larger than a radial thickness in a radial direction and a second extension, which extends onto the other sections, having a vertical thickness less than the vertical thickness of said first extension; and wherein said first section is the circumferentially largest of said plurality of sections.

* * * * *